July 30, 1957  D. A. SMITH  2,800,819
CLAMPING DEVICE HAVING A QUICKLY POSITIONED
AND SCREW-ACTUATED MOVABLE JAW
Original Filed March 7, 1952
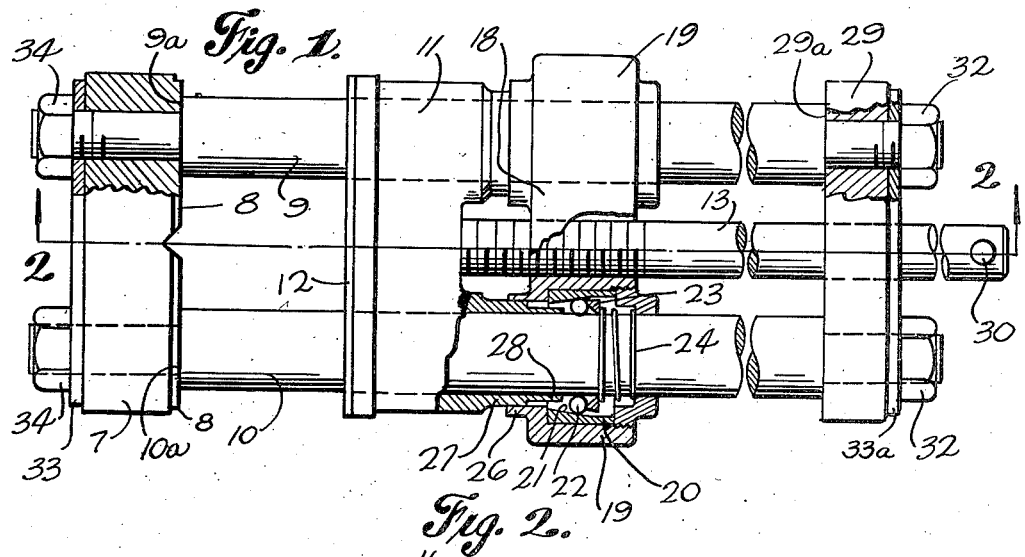
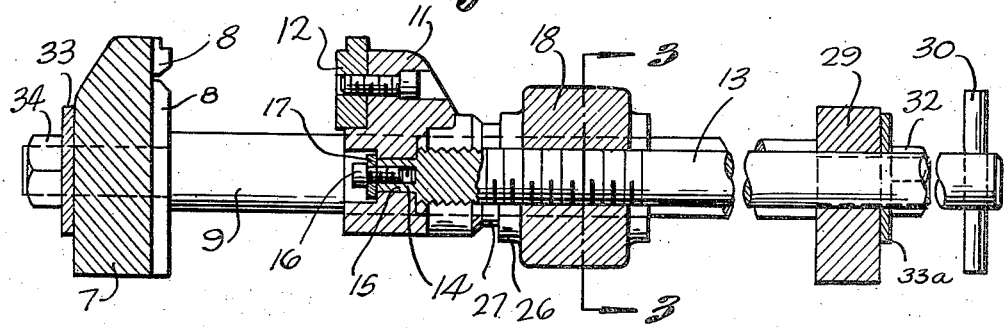
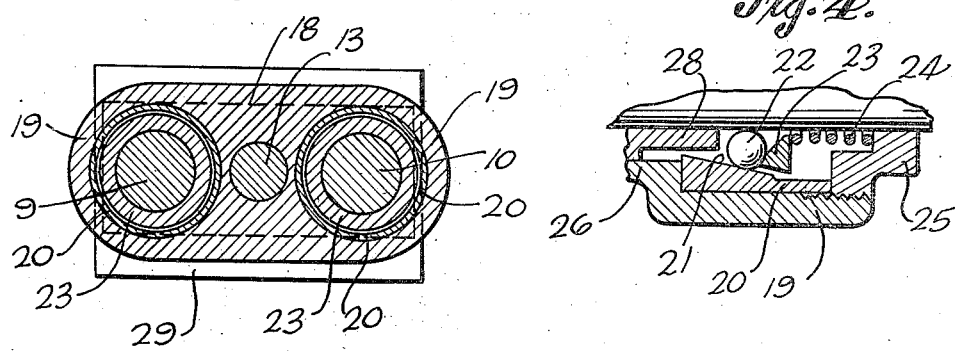
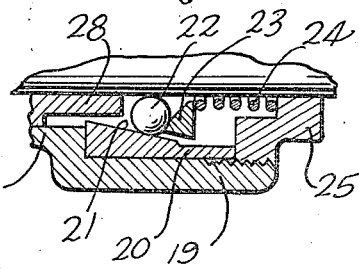
INVENTOR.
DONALD A. SMITH.
BY
ATTORNEY.

United States Patent Office 2,800,819
Patented July 30, 1957

2,800,819

CLAMPING DEVICE HAVING A QUICKLY POSITIONED AND SCREW-ACTUATED MOVABLE JAW

Donald A. Smith, Southfield Township, Wayne County, Mich., assignor to George H. Boyd Substituted for abandoned application Serial No. 275,315, March 7, 1952. This application May 14, 1956, Serial No. 584,829

2 Claims. (Cl. 81—17)

My invention relates to a new and useful improvement in a clamping device having a quickly positioned and screw-actuated movable jaw for clamping against pieces and particularly adapted for clamping workpieces while a working operation is being performed upon the workpiece. This application is substituted for my abandoned application, Serial Number 275,315, filed March 7, 1952.

The present invention constitutes an improvement in the clamping device illustrated in United States Letters Patent No. 2,223,644 issued to me on December 3, 1940. The feature present in the structure shown in said patent, namely that the clamping device may be easily and quickly moved to various positions of adjustment and automatically locked against reverse movement when thrust is delivered thereto, is also present in the present invention.

It is an object of the present invention to provide a clamping device of this type so constructed and arranged that when the two clamping members are moved into clamping position relatively to each other an increased pressure may be effected and the clamping members locked in this position by actuating a mechanism by which the operator would also move the clamping members relatively to each other before effecting such locking operation.

Another object of the invention is the provision in a clamping device of this class of a stationary abutment or clamping member toward and away from which a movable clamping or abutment member may be moved and provided with a mechanism for locking these abutment members when moved relatively to each other for clamping an object between the same without requiring any fine adjustment in the actuating mechanism.

Other objects will appear hereinafter.

It is recognized that various modifications and changes may be made in the detail of structure illustrated without departing from the invention and it is intended that the present disclosure shall be considered but the preferred embodiment.

Forming a part of this application are drawings in which:

Fig. 1 is a top plan view of the invention with parts broken away and parts shown in section;

Fig. 2 is a longitudinal sectional view taken on line 2—2 of Fig. 1 with parts broken away;

Fig. 3 is a sectional view taken on line 3—3 of Fig. 2;

Fig. 4 is an enlarged fragmentary sectional view illustrating the locking mechanism used in the invention.

As shown in the drawings, the invention comprises a clamping jaw or stationary abutment 7 on which are fastened removable work-engaging jaw plates 8. This member 7 is fixedly mounted on rods 9 and 10, bearing at one of its faces against shoulders 9a and 10a formed on the rods 9 and 10. These rods project through a wear-plate 33 and on the rods are threaded nuts 34, so that the member 7 is fixedly mounted on these two rods 9 and 10, which may be called guide rods. At the opposite ends of these guide rods is secured a plate 29, which bears at one of its faces against shoulders 29a formed on the rods 9 and 10 and held in position on these rods by means of nuts 32, which are threaded thereon and which bear against a wear-plate 33a.

Slideable on the rods 9 and 10 is a movable abutment or clamping jaw 11 having a detachable work-engaging jaw 12 secured thereon, as shown in Fig. 2. One end 14 of a rod 13 is projected through a passage 15 formed in the movable abutment member or jaw 11 for being swivelly mounted therein by means of a screw 16, which bears against a washer 17. In this manner the rod 13 is free to rotate relatively to the abutment member or jaw 11, while at the same time these parts are secured together in fixed axial relation. A retaining plate 18 is provided at its opposite ends with apertured heads 19 slidably mounted on the rods 9 and 10. The construction of each of the heads 19 is the same, so that a description of one will suffice for both. Positioned in the head 19, and around the corresponding guide rod, is a ring 20 having its inside surface inclined toward the periphery of the guide rod so as to form a cam surface 21 upon which ride locking balls 22, normally pressed by a ring 23 toward the smaller diameter of the conical cam surface 21, through the action of a spring 24. This spring 24 is held in position by a collar 25 threaded into the head 19. Projecting toward the head 19 from the movable jaw or abutment member 11 is a sleeve 27, which telescopes within an annular flange 26 extending from the head 19. This sleeve 27 is provided with a reduced terminal portion 28.

The rod 13 extends slidably through the plate 29 and may be rotated. This rod is provided with a threaded portion which threads through the retainer 18 so that, upon rotating the rod 13, the heads 19 may be moved toward and away from the movable abutment or jaw 11. For instance, in rotating the rod 13 clockwise (as viewed from the right hand end of Figures 1) the movable jaw 11 is moved away from the retaining member 18 and by rotating the rod 13 in the opposite direction the retainer plate 18 is moved toward the movable jaw or abutment member 11. A hand grip 30 is projected through the rod 13 for facilitating rotation of the same.

In use the structure may, of course, be mounted upon a table or suitable base. However, it may also be used as a portable tool. When it is desired to use the mechanism the movable jaw 11 would be moved toward the head 19 a sufficient distance by counterclockwise rotation of rod 13, so that the end of the terminal portion 28 of the sleeve 27 would engage the row of balls 22 and force them out of wedging relation with the cam surface 21, permitting such movement of the balls. When the parts are in this position the rod 13 may be freely moved longitudinally so as to slide the members 11 and 18 on the guide rods 9 and 10. Consequently, when it is desired to clamp an object between the stationary abutment 8 and the movable abutment 11, the object would be placed in position to be clamped and the rod 13 would then be moved longitudinally until the two abutments were in clamping relation to the object. When in this position a clockwise rotation of the rod 13 would first effect a withdrawal of the heads 19 from the movable jaw 11, so that the terminal portion 28 of the sleeve 27 would disengage the balls 22 so that they would be forced by the spring-pressed ring 23 to ride upon the cam surface 21 to securely lock the member 18 in fixed relation to the rods 9 and 10. Further clockwise rotation of the rod 13 would then effect a tighter clamping of the workpiece or object between the stationary and movable abutments, the member 18 serving as a stationary nut in this movement. It is believed obvious that the mechanism may thus be operated as a vise of the screw actuated type and that any desired pressure may be obtained through a rotation of the screw 13.

It is also believed obvious that no fine adjustment is necessary in the operation of the mechanism. By this is meant that the distance between a workpiece and the movable jaw 11, when the mechanism is in unlocked position on the rods 9 and 10, is not too important, since the subsequent forward travel of the jaw 11 is limited only by the threaded extent of the rod 13.

In the structure illustrated in the patent referred to, such fine adjustment was necessary because the degree of additional clamping which might be effected upon the clamped article, after the lock mechanism had moved to locking position, was limited to that amount of additional pressure which could be obtained through the toggle. In the present mechanism the amount of pressure is limited only by the strength of the operator and the strength of the various parts of the tool itself.

What I claim is:

1. A clamping mechanism of the class described, comprising: a stationary abutment member; a pair of spaced guide members secured to and projecting outwardly from said abutment member; a plate for connecting said guide members together; a movable abutment member slidably mounted on said guide members between said plate and said stationary abutment member; a head slidably mounted on said guide members between said plate and said movable abutment member; a threaded member threaded through said head and swivelly connected to said movable abutment member for, upon rotation, moving said movable abutment member toward or away from said head; a cam mechanism carried by said head and movable to operative and inoperative position for, upon moving to operative position, engaging said guide members and preventing slidable movement of said head away from said stationary abutment member; and means carried by said movable abutment member and movable, upon movement of said movable abutment member to a predetermined position toward said head in response to rotation of said threaded member in one direction, into position for releasing said cam mechanism for permitting free slidable movement of said head and said movable abutment member on said guide members, said head being retained in fixed relation to said rods during movement of said movable abutment member toward and away from said predetermined position.

2. A clamping mechanism of the class described comprising: a stationary abutment member; a pair of spaced guide members secured to and projecting outwardly from said abutment member; a plate for connecting said guide members together; a movable abutment member slidably mounted on said guide members between said plate and said stationary abutment member; a head slidably mounted on said guide members between said plate and said movable abutment member; a threaded member threaded through said head and swivelly connected to said movable abutment member for, upon rotation, moving said movable abutment member toward or away from said head; a cam mechanism carried by said head and movable to operative and inoperative position for, upon moving to operative position, engaging said guide members and preventing slidable movement of said head away from said stationary abutment member; and means carried by said movable abutment member and movable, upon movement of said movable abutment member to a predetermined position toward said head in response to rotation of said threaded member in one direction, into position for engaging and releasing said cam mechanism for permitting free slidable movement of said head and said movable abutment member on said guide members, said head being retained in fixed relation to said rods during movement of said movable abutment member toward and away from said predetermined position; and a spring mechanism for normally urging said cam mechanism into operative position.

References Cited in the file of this patent

UNITED STATES PATENTS

| 631,991 | James et al. | Aug. 29, 1899 |
| 1,058,625 | Pepper | Apr. 8, 1913 |
| 2,223,644 | Smith | Dec. 3, 1940 |
| 2,641,947 | Werne | June 16, 1953 |

FOREIGN PATENTS

| 278,865 | Germany | Oct. 6, 1914 |